US008110061B2

(12) United States Patent
Moore

(10) Patent No.: US 8,110,061 B2
(45) Date of Patent: Feb. 7, 2012

(54) RESPIRATORY NASAL FILTER

(76) Inventor: Joseph K. Moore, New Port Richey, FL (US)

( * ) Notice: Subject to any disclaimer, the term of this patent is extended or adjusted under 35 U.S.C. 154(b) by 980 days.

(21) Appl. No.: 11/928,226

(22) Filed: Oct. 30, 2007

(65) Prior Publication Data

US 2008/0099021 A1 May 1, 2008

Related U.S. Application Data

(60) Provisional application No. 60/855,711, filed on Oct. 31, 2006.

(51) Int. Cl.

| | |
|---|---|
| ***B29C 65/00*** | (2006.01) |
| ***B32B 37/00*** | (2006.01) |
| ***B32B 38/04*** | (2006.01) |
| ***B32B 9/00*** | (2006.01) |
| ***B32B 33/00*** | (2006.01) |
| ***A62B 7/10*** | (2006.01) |

(52) U.S. Cl. ....... 156/267; 156/256; 156/264; 428/40.1; 428/42.3; 428/304.4; 128/205.27; 128/205.29; 128/206.14; 128/206.18

(58) Field of Classification Search ............. 128/200.24, 128/205.27, 205.2, 206.11, 206.16, 206.18, 128/206.19, 57, 848, 858; 602/41-59, DIG. 24, 602/189; 606/199-204; 55/DIG. 35, 385.1, 55/385.2, 524; 428/40.1, 42.3, 304.4; 156/267, 156/256, 264

See application file for complete search history.

(56) References Cited

U.S. PATENT DOCUMENTS

| | | | | |
|---|---|---|---|---|
| 4,004,584 | A * | 1/1977 | Geaney | 128/206.14 |
| 4,955,945 | A * | 9/1990 | Weick | 128/203.12 |
| 4,984,302 | A * | 1/1991 | Lincoln | 2/206 |
| 5,392,773 | A | 2/1995 | Bertrand | |
| 5,562,107 | A * | 10/1996 | Lavender et al. | 128/888 |
| 5,636,629 | A | 6/1997 | Patterson, Jr. | |
| 5,740,798 | A | 4/1998 | McKinney | |
| 5,746,200 | A | 5/1998 | Draenert | |
| 6,090,060 | A * | 7/2000 | Radow | 602/74 |
| 6,213,121 | B1 | 4/2001 | Cardarelli | |
| 6,701,924 | B1 | 3/2004 | Land, Jr. et al. | |
| 6,967,261 | B1 * | 11/2005 | Soerens et al. | 602/48 |
| 7,004,165 | B1 | 2/2006 | Salcido | |
| 7,156,099 | B1 | 1/2007 | Jenkins | |
| RE39,896 | E * | 10/2007 | Arnold et al. | 602/54 |
| 7,659,439 | B2 * | 2/2010 | Grossman | 602/57 |
| 2004/0089303 | A1 * | 5/2004 | Chien | 128/206.11 |
| 2004/0194784 | A1 * | 10/2004 | Bertrand | 128/206.18 |

* cited by examiner

*Primary Examiner* — Justine Yu
*Assistant Examiner* — Annette Dixon
(74) *Attorney, Agent, or Firm* — John P. Morgan, Esq.; Holland & Knight LLP

(57) ABSTRACT

A respiratory nasal filter including an outer ring having concentric outer periphery and inner periphery sized to the periphery of a user's nasal orifice, a filter layer having an outer periphery larger than the inner periphery of the outer ring, but smaller than the outer periphery of the outer ring and an adhesive applied to the outer ring for bonding the filter layer concentrically to the outer ring and for bonding the outer ring to the columella, a nasal sill, an alar sidewall and the facet of the user's nose.

5 Claims, 7 Drawing Sheets

RESPIRATORY NASAL FILTER

CROSS-REFERENCE TO RELATED APPLICATION

This application claims the benefit of U.S. Provisional Application No. 60/855,711, filed Oct. 31, 2006, the disclosure of which is hereby incorporated by reference herein.

BACKGROUND OF THE INVENTION

1. Field of the Invention

This invention relates to a respiratory filter for use by an individual to assist in filtering pollutants.

2. Description of the Background Art

Presently, there exists a need to filter contaminants, pollutants, and other environmental elements from entering a person's nasal passages. U.S. Pat. No. 5,392,773, the disclosure of which is incorporated by reference herein, discloses a respiratory particulate nasal filter with a fine mesh filtering material that is intended to be removably adhered to the lower surfaces of a person's nose to fully cover both of the person's nostrils. The adhesive section has distal, medial, and proximal adhesive tabs which secure and seal the filter while leaving the upper surfaces of the nose exposed. The fine mesh filter functions to filter the air the person breaths through his nose to thereby reduce contaminates, bacteria, viruses that might otherwise be inhaled. The filter taught by U.S. Pat. No. 5,392,773 comprises tabs that facilitate attachment over both of the person's nostrils. The tabs also facilitate removal. However, because the filter fits over both nostrils and is tabbed, the filter is quite noticeable when worn. Additionally, because the proximal tab is generally rectangular in shape to connect the triangular shape of the filter to the skin found at the junction of the face with the bottom of the nose, this creates difficulty and discomfort in removing the filter from a wearer's face as the filter pulls unnecessarily on facial hair in this region. For these reasons, some people are reluctant to wear the filter.

U.S. Pat. No. 5,740,798, the disclosure of which is incorporated by reference herein, discloses a disposable nasal band filter, which covers the exterior of the user's nose. The approach of the '798 patent requires an elastic strand which is noticeable and visible externally, which makes the device less tolerable for wearing for long periods of time. The approach of the '798 patent is also cumbersome and invasive reducing the usability of the filter.

U.S. Pat. No. 7,004,165, the disclosure of which is incorporated herein by reference, similarly requires external hardware in order to provide filtration to the nasal passages. The filter of the '165 patent requires a supporting arrangement which includes a pair of elongated ear support members which the user is required to wear. Such a filter device is cumbersome, heavy and quite noticeable externally.

Likewise, U.S. Pat. No. 5,636,629, the disclosure of which is incorporated herein by reference, discloses an externally worn nasal glove. The nasal glove of the '629 patent requires a band worn around or about the user's face. This nasal glove is cumbersome and externally visible when worn. As with the previously mentioned patents, this nasal glove covers both nostrils at the same time, adding to its cumbersome nature.

Other prior art nasal filters must be inserted into the nasal passage. U.S. Pat. No. 7,156,099, the disclosure of which is hereby incorporated by reference herein, discloses a nasal insert, having a flexible frame. This nasal insert is placed inside the nostrils, as opposed to worn outside the nostril. Such an approach not only subjects the nasal insert to additional contamination, but also crushes nasal hairs within the nostril. These nasal hairs are the first defense against the very pollutants and contaminants sought to be excluded from the nasal passage by the teachings of the present invention.

Similarly, U.S. Pat. Nos. 6,701,924; 5,746,200; and 6,213,121, the disclosures of which are each hereby incorporated by reference herein, each require the nasal filter be inserted into the nasal passage.

Therefore, it is an object of this invention to provide an improvement which overcomes the aforementioned inadequacies of the prior art devices and provides an improvement which is a significant contribution to the advancement of the respiratory nasal filter art.

Another object of this invention is to provide a respiratory nostril filter that is esthetically pleasing to wear without being too noticeable.

Another object of this invention is to provide a respiratory nostril filter that is lightweight and unnoticeable when worn by the user.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a hypoalogenic clear, almost non-visible, oval-shaped respiratory nasal filter designed to be adhered about a single nostril of a person. The filter is designed in an oval-shaped configuration and proportionately sized to fit over a person's nasal passage. The filter layer is made of a woven fiber for the filtration of air to help prohibit the inhalation of foreign pollutants, pollens, poisons, viruses and other airborne contaminates. The clear adhesive layer comprises a corresponding clear ring with an adhesive applied to one side that encircles the filter layer. The adhesive functions to allow the filter layer to be adhered thereto. The adhesive also functions to adhere to the periphery of the person's nostril.

The filter is ideal for use in the medical, industrial, pharmaceutical and environmental fields in addition to being ideal for use by the general public, particularly those with asthma and/or allergies to everyday exposure of daily contaminants. Additionally, the filter greatly reduces the inhalation of second hand smoke which has been proven to cause disease at any level.

The filter of the present invention is lighter weight and achieves much greater tolerability than prior art nasal filters, while only using as little as $1/10^{th}$ of the materials needed with prior art filters. The filter, utilizing a smaller filter media than prior art filters, allows the filter to be placed closer to the nasal passage, without actually being inserted into the nasal passage. As discussed at length herein, this results in the filter being less visible or noticeable when worn.

The close proximity of the filter to the nasal passage also allows back pressure from a user's exhalation to clean the filter mechanism. Further, because the filter is designed to be worn on an individual nostril, the filter can create an inner and outer seal for greater effectiveness in excluding pollutants and contaminants from the user's respiratory system, while only covering approximately 1/16$^{th}$ of an inch of skin per nasal passage.

Additionally, due to the small size of the nasal filters, the filters are extremely lightweight, leading to make the filter unnoticeable to the user when wearing the filter. Similarly, this small size allows for construction of the nasal filter utilizing less filter material than has been required by other nasal filters. Similarly, the thin nonvisible self-sealing outer ring of the nasal filter disclosed herein allows for individually sealing the nasal cavity off without insertion of a nasal filter or other additional discomfort.

The filter's small and novel design also overcomes the prior art's requirement that the filter be visible when worn. The design is not only small, which necessarily reduces its visibility, but also relies upon clear adhesives and skin colored filters thus minimizing any visibility of the filter.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
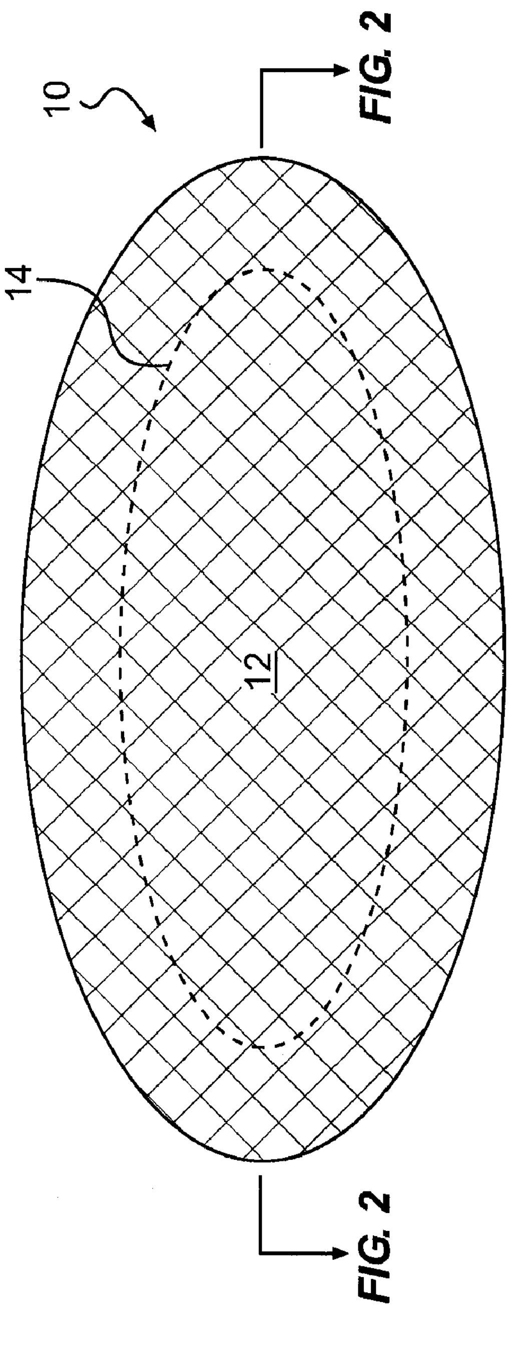
FIG. 1 is a plan view of the first embodiment of the respiratory nasal filter of the invention.
Figure 2:
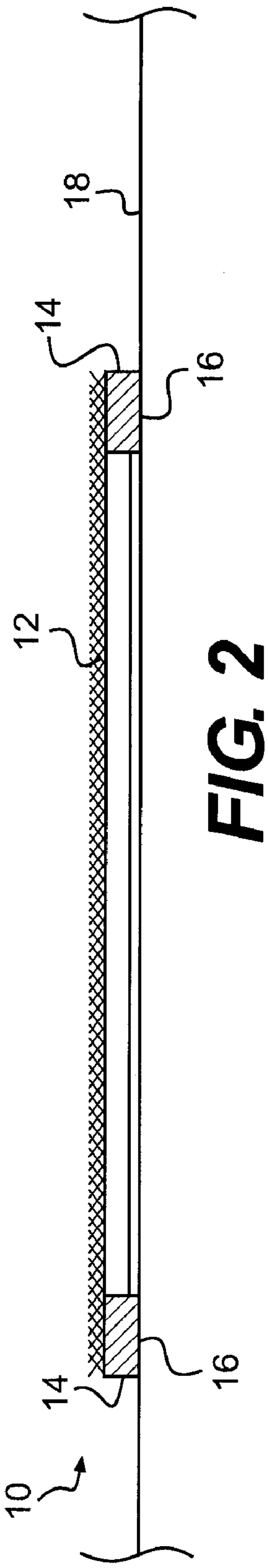
FIG. 2 is a longitudinal cross-sectional view of FIG. 1 along lines 2-2 showing the layers of the respiratory nasal filter of the invention.

As shown in FIG. 1, the nasal filter 10 of the first embodiment of the invention comprises a generally oval-shaped configuration dimensioned to be slightly larger than the usual size of the periphery of a person's nasal orifice, namely a person's nostril. As best shown in FIG. 2, the nasal filter 10 comprises a filter layer 12 composed of a microporous filter material. The microporous filter material of the filter layer 12 preferably is composed of a moisture resistant filter material with sufficient pore size to filter out the unwanted particulate, bacteria or virus.

The microporous filter is preferably a spunlaced polyester fabric. This spunlaced fabric is nonwoven. A preferred nonwoven fabric is the PS-1025 provided by Polymer Science, Inc., the technical disclosure of which is hereby incorporated by reference. The PS-1025 is a ¾ ounce beige colored apertured spunlaced polyester fabric, with a total thickness of 0.003 inches. As would be appreciated by a personal skilled in the art, various color nonwoven fabrics could be utilized so as to match the nostril filter 10's color as closely as possible to the color and hue of the user's skin, further diminishing the nostril filter 10's visibility when worn. Similarly, transparent nonwoven fabrics could be utilized, which would also reduce the visibility of the nostril filter when worn. This fabric is comfortable while also mechanically stable allowing the fabric to be used effectively in the nasal filter disclosed herein.

The microporous filter layer 12 is permanently adhered to the upper surface of an oval ring-shaped base layer 14, preferably composed of a clear plastic material. An adhesive 16 is applied to the underside of the base layer 14. Adhesive 16 is designed to securely adhere to the peripheral edge of the person's nostril, yet is removable when desired. During manufacturing, the filter 10 may be packaged onto a releasable carrier sheet 18.

Figure 7:
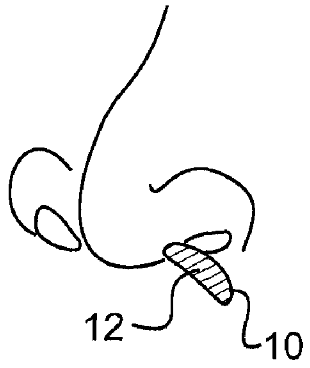
FIG. 7 is a perspective view showing the nasal filter being attached to the periphery of a nasal orifice of a user.
Figure 8:
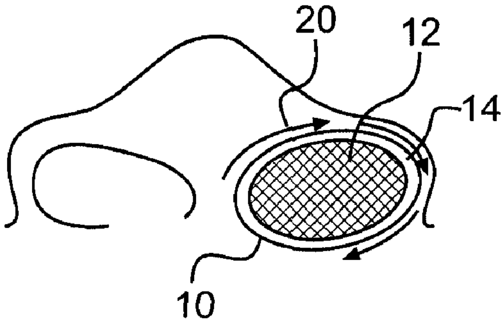
FIG. 8 is a plan view showing the nasal filter attached to the periphery of a nasal orifice of a user.

During use, the person simply pulls one of the filters 10 from the carrier sheet 18 and aligns it over one of his nostrils. See FIG. 7. Upon alignment, the filter 10 is pressed onto the leading peripheral edge of a nasal orifice, as shown in FIG. 8. As indicated by the arrows 20 in FIG. 8, the user firmly attaches the nasal filter 10 to the periphery of the user's nostril by guiding the nasal filter 10 around the entire nasal orifice to create a complete seal. The person then removes another filter 10 from the carrier sheet 18 and similarly positions it over his other nostril.

Figure 9:
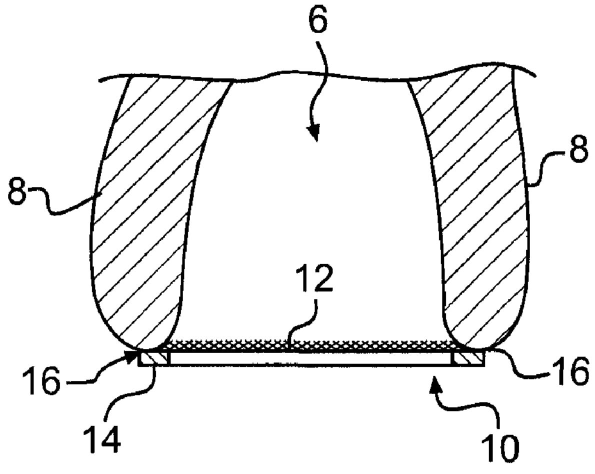
FIG. 9 is a cross-sectional view of the nasal filter attached to the periphery of a nasal orifice of a user.
Figure 10A:
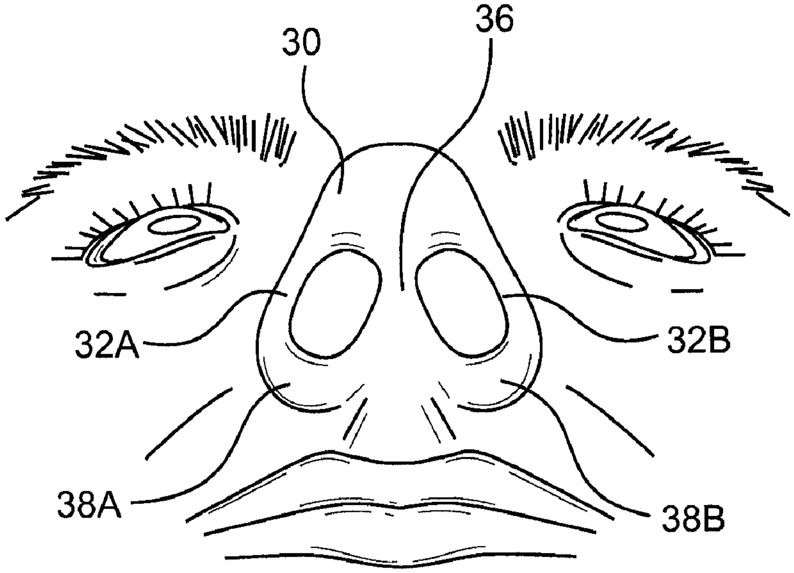
FIG. 10A is plan view showing a user's nose prior to attaching the nasal filters.
Figure 10B:
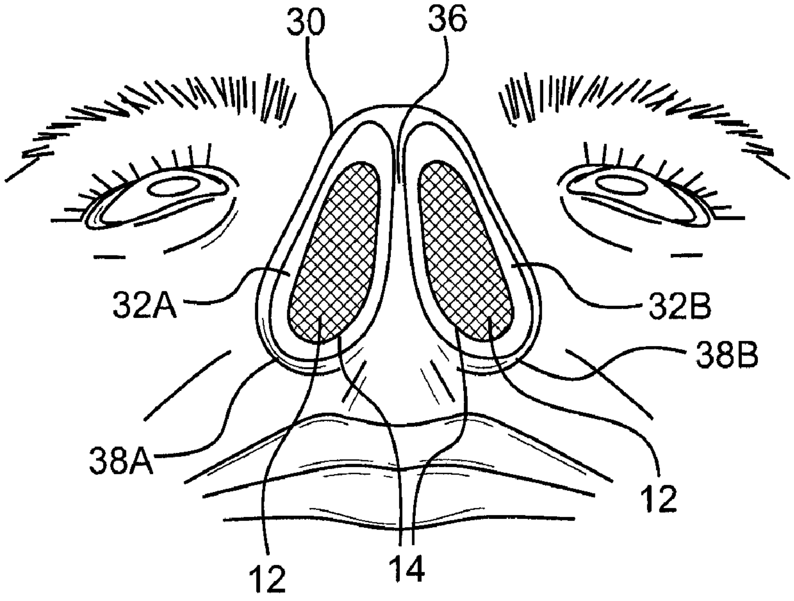
FIG. 10B is a plan view showing two nasal filters attached to the peripheries of each of a user's nostrils.

FIG. 9 shows a cross sectional view of a user's nasal orifice 6 while wearing the nasal filter 10. As shown, the nasal filter 10 is attached firmly, by way of the adhesive 16, to the periphery of the user's nasal orifice 8. As shown, the filter layer 12 then serves to filter all air coming into the user's nasal passage 6.

FIGS. 9A and 9B show a user's nose and the pertinent features thereto in detail. In FIG. 9A, the user is not wearing the nostril filters 10, while in FIG. 9B, the user is wearing two nostril filters 10. As shown, the nostril filters 10 bond to the periphery of the user's nasal orifices. The anterior portion of the nostril filter 10 bonds with the facet or soft tissue triangle 30 of the user's nose. The lateral portions of the nostril filters 10 bond with the alar sidewalls 32A and 32B of the user's nose. The medial portion of the nostril filter 10 bonds with the columella 36 of the user's nose. The posterior portion of the nostril filters 10 bonds with the nostril sills 38A and 38B of the user's nose. As described above, the nostril filter 10 is thus firmly sealed around the entirety of the user's nasal opening.

Notably, the ring-shaped base layer 14 may comprise an appropriate size and configuration that fits a traditional nostril size such that it only adheres to the peripheral edge of the nostril (not to the inside the nostril nor over too much area of the nose). Indeed, ring-shaped base layer 14 may be offered in multiple sizes (e.g., small, medium and large) to accommodate noses of different sizes. Importantly, the clear, nearly transparent, appearance of the ring-shaped base layer 14 assures that the outward appearance of wearing the nostril filters 10 will be minimized. The nostril filters 10 of the invention will therefore be esthetically pleasing to wear without being too noticeable.

This microporous filter layer 12 and ring-shaped base layer 14 are flexible, allowing the nasal filter to completely seal a nostril. Due to this innovative design, the ring-shaped base layer 14 should be no more than 1/16 of an inch wide, and preferably as small as 1/32 of an inch wide. This minimal size combined with the flexibility of the material is sufficient to firmly attach the nostril filter 10 to the user's nostril, regardless of the shape and size of the respective nostril.

Figure 3:
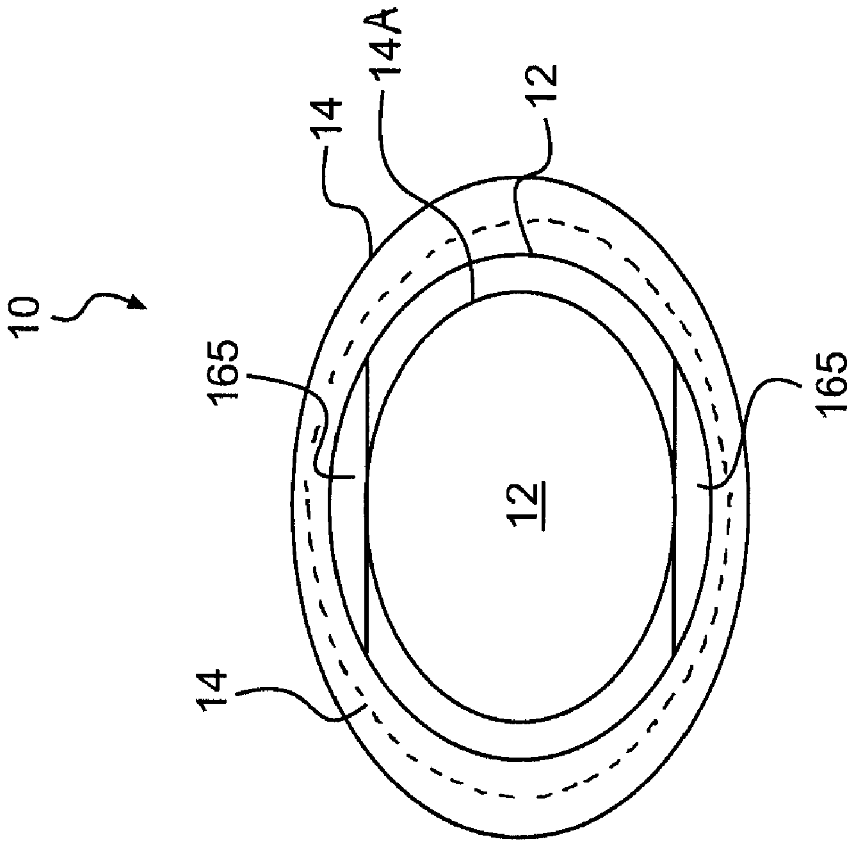
FIG. 3 is a plan view of the second embodiment of the respiratory nasal filter of the invention.
Figure 4:
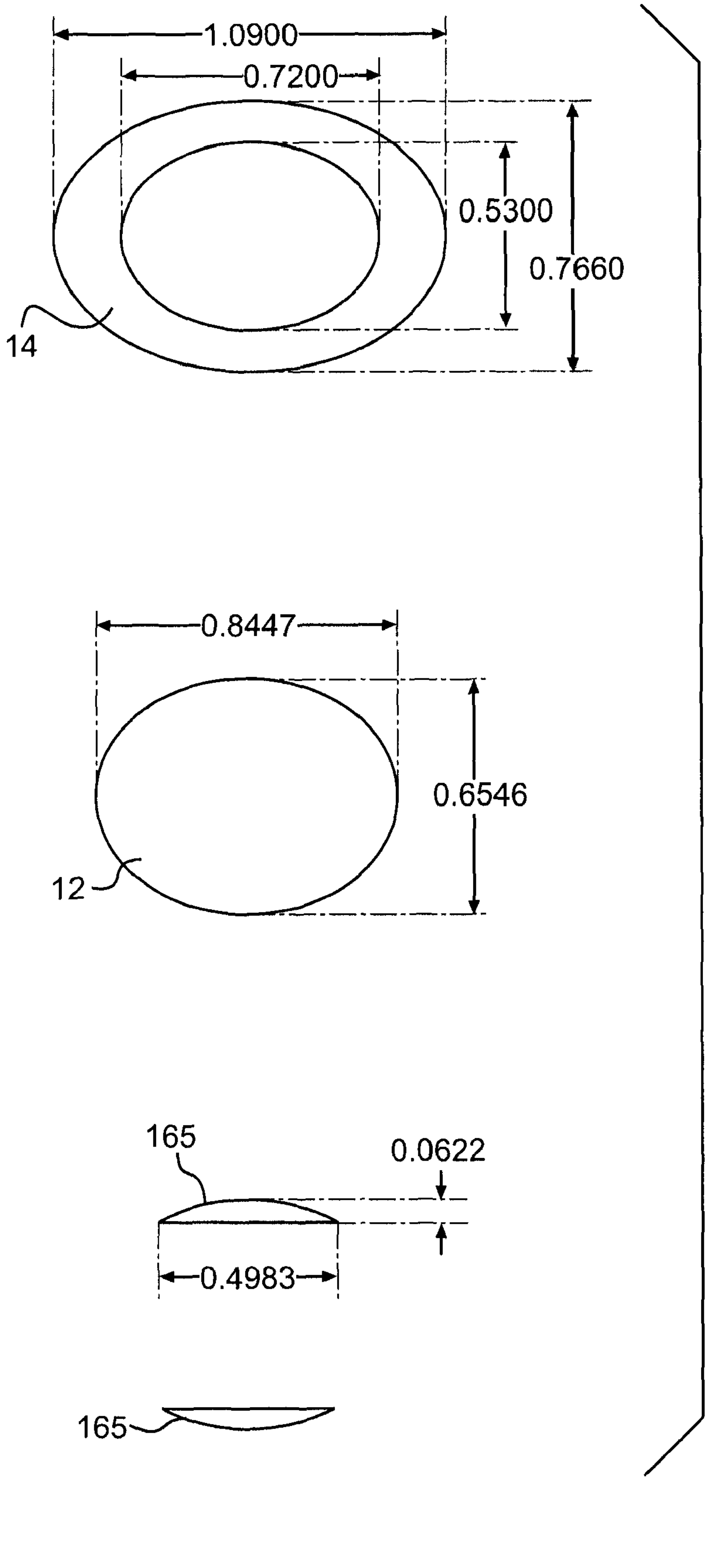
FIG. 4 is an exploded view of FIG. 3 showing the filter layer, the clear base layer and the layer of additional adhesive.
Figure 5:
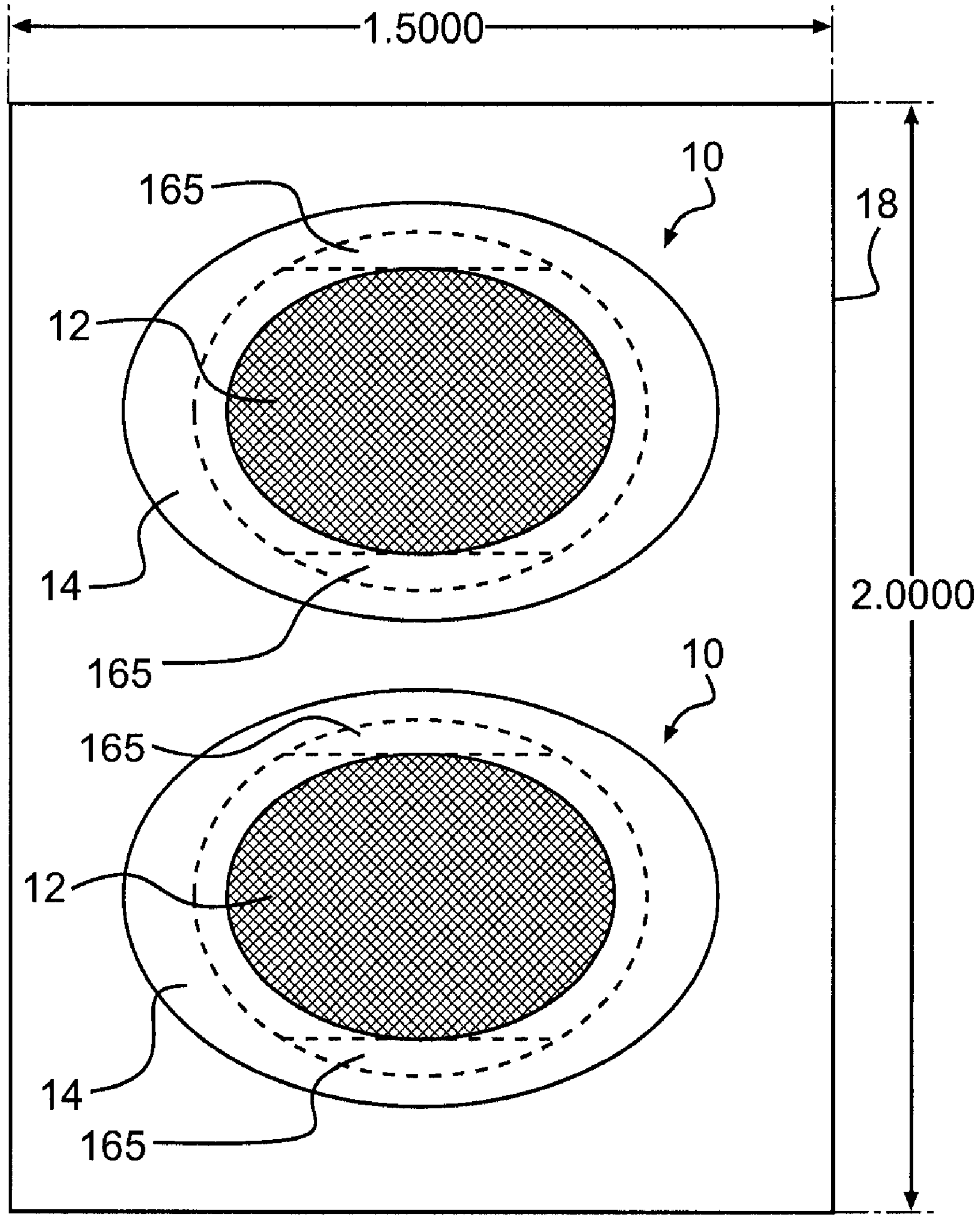
FIG. 5 is a plan view showing a manner is which the respiratory nasal filter of the invention may be mounted onto a carrier sheet during packaging.

Referring now to FIGS. 3-5, the second embodiment of the respiratory nasal filter 10 of the invention comprises a clear, oval ring-shaped base layer 14 with the adhesive 16 applied to the underside of the base layer 14. The filter layer 12 is formed in a smaller size relative to the clear base layer 14 and is affixed to the underside of the base layer 14. The base layer 14 therefore slightly overlaps the peripheral edge of the filter layer 12 such that the filter layer 12 is adhered to its underside by the adhesive 16. However, the size of the base layer 14 is sufficiently large to define an adhesive area 14A on the base layer 14 beyond the periphery of the filter layer 12. The adhesive 16 thus functions to permanently adhere the filter layer 12 to its underside while also providing adhesive area 14A that removably adheres to the person's skin about the periphery of the person's nostrils.

It is noted that additional adhesiveness may be provided to the adhesive area 14A. More specifically, a stronger adhesive 165 may be applied to the inner portions of the filter layer 12 that overlap with the base layer 14. As shown, the stronger adhesive 165 may comprise spots of adhesive 165 that are applied to opposing sides of the overlapping of the filter layer 12 and base layer 14. In this regard, it is believed that only two spots are necessary to provide adequate adherence to the peripheral edge of the person's nostril.

Different strength adhesives can be utilized for different uses. For instances, industrial uses where high level of airborne contaminants are present benefit from stronger adhesives. These stronger adhesives securely maintain the seal around the user's nostril preventing contaminants from entering the user's nasal passage. A preferred industrial adhesive is a double coated medical grade acrylic pressure sensitive adhesive such as Polymer Science, Inc.'s PS-1006, the technical specifications of which are hereby incorporated by reference. Polymer Science, Inc.'s PS-1006 is a double coated high performance medical grade acrylic adhesive with a polyethylene carrier on a 54# C2S paper differential release liner. Adhesives such as the PS-1006 from Polymer Science, Inc. bond well to most porous and non-porous surfaces. Additionally, these adhesives have high initial tack, enabling immediate application to a user's nostril once the nasal filter is removed from its packaging. Similarly, these adhesives provide exceptional skin adhesion and leave no residue when removed from the skin.

Alternatively, for more recreational usages whereby the contaminant level is not so severe, a lighter weight adhesive suffices. A preferred recreational adhesive is a single coated medical grade acrylic pressure sensitive adhesive, such as Polymer Science, Inc.'s PS-1010, the technical specifications of which are hereby incorporated by reference. Polymer Science, Inc.'s PS-1010 is a single coated high performance medical grade acrylic adhesive with a polyethylene carrier on a 54# C2S paper differential release liner. Adhesives such as the PS-1010 from Polymer Science, Inc. bond well to most porous and non-porous surfaces. Additionally, these adhesives have high initial tack, enabling immediate application to a user's nostril once the nasal filter is removed from its packaging. Similarly, these adhesives provide exceptional skin adhesion and leave not residue when removed from the skin.

The novel nasal filter disclosed herein also provides substantial improvement in weight, breatheability and tolerability for users to wear the nasal filter.

FIG. 4 depicts a preferable embodiment of the nostril filter 10. As shown in FIG. 4, outer ring base layer 14 is generally oval in shape having two axes of symmetry, where each axes of symmetry has an outer diameter and an inner diameter. Along the horizontal axis, the outer diameter, in a preferable embodiment, is 1.0900 inches, while the inner diameter is 0.7200 inches. Along the vertical axis, the outer diameter is 0.7660 inches while the inner diameter is 0.5300 inches. The outer ring base layer 14 is preferably a clear polyethylene overlaminate. Pressure sensitive adhesive 16 is applied to one side of the outer ring base layer 14. When the filter layer 12 is connected to the outer ring base layer 14, the pressure sensitive adhesive 16 bonds the filter layer 12 to the outer ring base layer 14. As explained below, the outer diameter of the filter layer 12 is smaller than the outer diameter of the outer ring base layer 12, thus creating an overlap when the filter layer 12 is affixed to the outer ring base layer 14. The pressure sensitive adhesive 16 on this overlapping portion of the outer ring base layer 14 will bond to the user's skin when the nostril filter 10 is in use.

The filter layer 12 is also generally oval in shape having two axes of symmetry. The horizontal axis diameter is 0.8447 inches, while the vertical axis diameter is 0.6546 inches. When configured as described herein such that the filter layer 12 is arranged on the outer ring base layer 14, approximately 0.122 inches of the outer ring base layer 14 along the horizontal axis is exposed. Similarly, approximately 0.0557 inches of the outer ring base layer 14 along the vertical axis is exposed. Additionally, as shown in FIG. 4, the bottom adhesive layer 165 is preferably 0.4983 inches long and approximately 0.0622 inches high such that the bottom adhesive layer 165 overlaps the filter layer 12 along the horizontal axis, thus providing additional securement to the user's nose.

Figure 6:
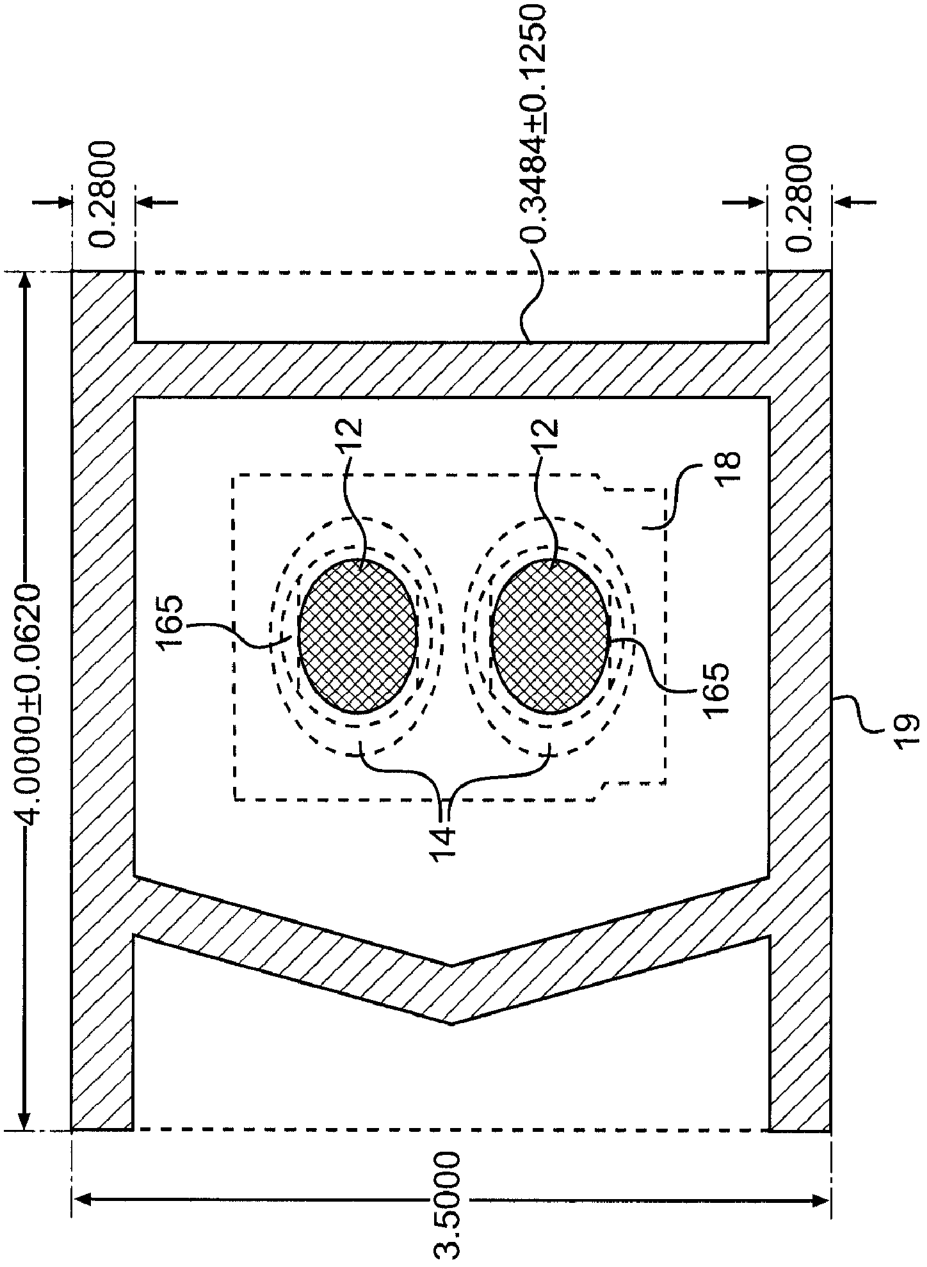
FIG. 6 is a plan view showing a manner in which the respiratory nasal filter of the invention may be packaged.

Finally, as noted above in connection with the first embodiment, a pair of the respiratory nasal filters 10 of the invention may be mounted onto a carrier sheet 18 during packaging. See FIG. 5. Once mounted, a preferable way to package and distribute the nasal filters 10 is in individual heat sealed polyester packaging 19, such as depicted in FIG. 6.

The nostril filter 10 disclosed herein also benefits from the following novel manufacturing process. First, the raw materials comprising the non-woven fabric filter layer 12, the pressure sensitive skin-safe adhesive 16 and the polyethylene overlaminate base layer 14 are cut to two inches wide so that these raw materials can properly move through the manufacturing equipment. Notably, the base layer 14 comes preconfigured with one side containing pressure sensitive skin-safe adhesive 16. Additionally, the manufacturing process described herein operates with two nostril filters 10 being prepared side-by-side at the same time.

Next, the pressure sensitive skin-safe adhesive 16 is cut into strips 165, which form the additional adhesive used to provide enhanced securement to a user's nose. These strips 165 are then affixed to the filter layer 12. The filter layer 12 containing the two strips 165 is then cut into the oval pattern described above, namely an oval shape having a horizontal axis diameter of 0.8447 inches and a vertical axis diameter of 0.6546 inches.

During this step in the process, the inner periphery is cut out of the overlaminate base layer 14. This inner periphery, as discussed above, is oval in shape having a horizontal diameter of 0.7200 inches and a vertical axis diameter of 0.5330 inches.

Once the inner periphery of the base layer 14 is cut out, the remaining base layer 14 material is overlaid onto the filter layer 12, positioning the adhesive side of the base layer 14 to be in contact with the filter layer 12 so as to position the filter layer 12 over the inner periphery that had been cut out of the base layer 14.

Next, the outer periphery of the base layer 14 (which now is affixed to the filter layer 12) is cut into the oval shape discussed above, namely having a horizontal axis diameter of 1.0900 inches and a vertical axis diameter of 0.7660 inches. At this stage, the nostril filter 10 has been manufactured and is ready to be packaged.

As mentioned above, this process is done so as to prepare two nostril filters 10 simultaneously. Now, a carrier sheet 18 is placed over the side-by-side finished nostril filters 10. This carrier sheet 18 is then cut so that a carrier sheet 18 contains two nostril filters 10. Finally, the pair of filter assemblies 10 are packaged in heat sealable polyester packaging 19.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A method of manufacturing a respiratory nasal filter comprising:

laying down a base layer which has a first side including an adhesive, and a second side;

laying down a non-woven fabric filter layer;

cutting a skin-safe pressure sensitive adhesive into two strips;

affixing the two strips of skin-safe pressure sensitive adhesive to the non-woven fabric filter layer;

cutting the non-woven fabric filter layer bonded to the two strips of skin-safe pressure sensitive adhesive into an oval;

cutting an inner oval out of the base layer whereby the inner oval cut out of the base layer is smaller than the oval cut out of the non-woven fabric filter layer;

aligning and laying down the base layer onto the oval cut filter layer concentrically such that the filter layer covers the inner oval that was cut out of the base layer; and cutting an outer oval out of the base layer whereby the outer oval cut out of the base layer is larger than the oval cut out of the non-woven fabric filter layer creating a nostril filter.

2. The method of manufacturing the respiratory nasal filter of claim 1 whereby the non-woven filter layer is beige.

3. The method of manufacturing the respiratory nasal filter of claim 1 whereby the skin-safe pressure sensitive adhesive is a medical grade acrylic pressure sensitive adhesive.

4. The method of manufacturing the respiratory nasal filter of claim 3 whereby the skin-safe pressure sensitive adhesive is a single-coated medical grade acrylic pressure sensitive adhesive.

5. The method of manufacturing the respiratory nasal filter of claim 3 whereby the skin-safe pressure sensitive adhesive is a double-coated medical grade acrylic pressure sensitive adhesive.

* * * * *